United States Patent Office 3,158,612
Patented Nov. 24, 1964

3,158,612
SYNTHESIS OF 2-AMINO-3-METHOXY 5-CHLORO PYRAZINE
Luigi Bernardi, Milan, and Giovanni Larini and Anselmo Leone, Settimo Torinese, Turin, Italy, assignors to Società Farmaceutici Italia, Milan, Italy, a corporation of Italy
No Drawing. Original application Nov. 3, 1961, Ser. No. 149,852. Divided and this application Sept. 17, 1962, Ser. No. 230,023
Claims priority, application Italy, Nov. 7, 1960, 19,284/60
1 Claim. (Cl. 260—250)

This application is a division of our U.S. patent application Serial No. 149,852, filed November 3, 1961.

The invention relates to a number of new pyrazine derivatives and to a process of preparing them. It particularly relates to a new process for obtaining the sulfa drug 3-methoxy-2-sulfapyrazine, employing therein novel derivatives of 2,3-bis-substituted 5-chloro-pyrazine having the following general formula:

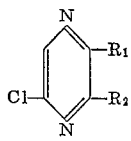

wherein when $R_2$=Cl, $R_1$=Cl or $NH_2$ or

—$NHSO_2$—$C_6H_4$—NHR′ and when $R_2$=$OSH_3$, $R_1$=$NH_2$ or

—$NHSO_2$—$C_6H_4$——NHR′

R′=H, or acyl, such as acetyl or other acyl radical of a lower alkanoic or fatty acid.

The sulfonamide 3-methoxy-2-sulfapyrazine, together with processes of preparing it, and its pharmacologic and therapeutic characteristics, have been described by B. Camerino and G. Palamidessi in Belgian Patent 592,932. Some of such processes, particularly those involved in the preparation of the intermediates 3,5-dibromo-2-aminopyrazine, and of 2-sulfanilamido-3-chloro-pyrazine, are not desirable from the industrial point of view, because the yields are low, and/or long and expensive operations are required to obtain the said intermediates.

Our search for new and economical methods of synthesis of the 3-methoxy-2-sulfapyrazine resulted in an advantageous and unexpected process for the preparation of the above-said sulfonamide, through the said novel pyrazine derivatives. Also, a number of said novel pyrazine derivatives are useful both for their bacteriostatic properties as well as their utility as intermediates for the production of other pyrazines useful in various fields.

The process of the present invention follows the following scheme:

SCHEME

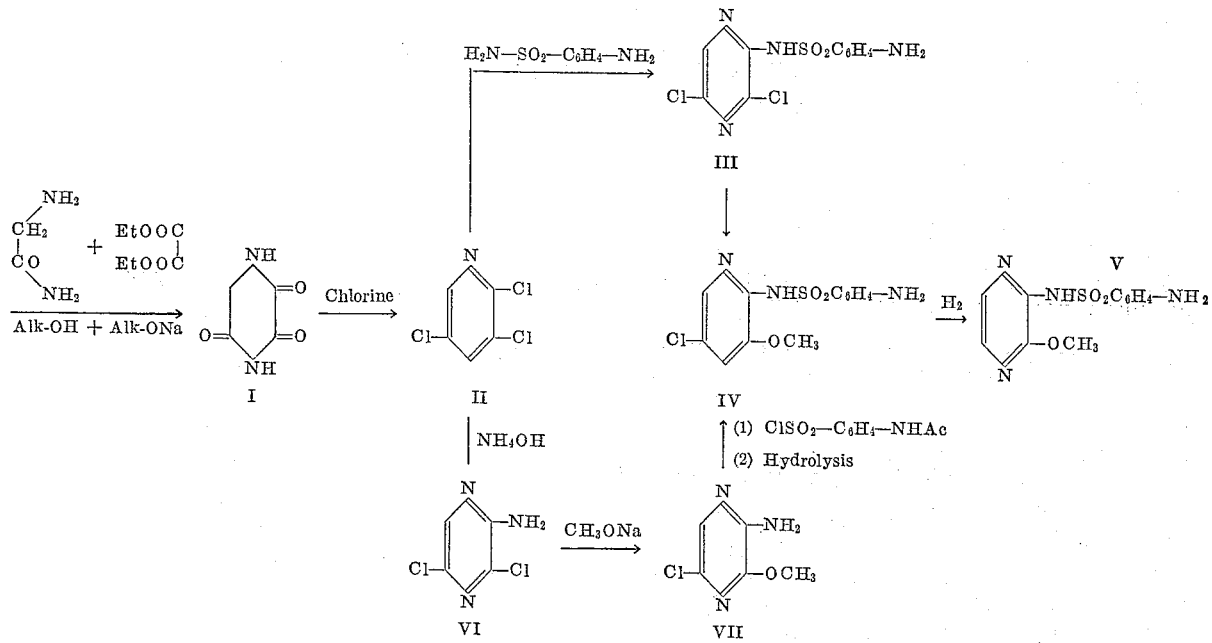

The starting product for the process of the present invention is 2,3,5-triketo-piperazine (I), a substance hitherto obtainable by the complex synthesis described by M. Bergman et al. in the Ztsch. für Physiol. Chem. 146, 1925, page 247.

In accordance with the present invention, the 2,3,5-triketo-piperazine is conveniently and advantageously synthesized by condensing amino-acetamide (prepared as described by G. Karmas and P. Spoerri in J. Am. Chem. Soc. 74, 1952, page 1580) or one of its salts with a mineral acid, such as the hydrochloride, with ethyl oxalate either in solution or in suspension in lower aliphatic alcohols preferably methanol or ethanol, in the presence of the sodium salt of the alcohol (1 mole if the free base of amino-acetamide is used or 2 moles if the hydrochloride of amino-acetamide is used), over a period of time ranging from 15 minutes to several hours, at 40–80° C., preferably at the boiling temperature of the reaction mixture. The yield of 2,3,5-triketo-piperazine is almost quantitative.

The 2,3,5-triketo-piperazine is then chlorinated to 2,3,5-trichloro-pyrazine (II) by reaction with phosphorus oxychloride or a mixture of phosphorus oxychloride and phosphorus pentachloride, preferably or optionally in the presence of tertiary amines such as pyridine or dimethylaniline, preferably at a temperature between 100 and 170° C. over a period of time ranging from several hours to 100 hours, preferably from 2 to 60 hours.

5-chloro-3-methoxy-2-sulfapyrazine (IV) is prepared from the 2,3,5-trichloro-pyrazine (II) through either of two syntheses.

In one synthesis, 2,3,5-trichloro-pyrazine (II) is transformed into 3,5-dichloro-2-sulfapyrazine (III), by reaction with sulfanilamide in the presence of an acid acceptor such as potassium carbonate or acetate or an alkaline salt of sulfanilamide, at a temperature ranging from 80 to 150° C., in the presence or not of high boiling solvents. Upon treating the 3,5-dichloro-2-sulfapyrazine with an alkaline salt of methyl alcohol in alcoholic solution, such as sodium or potassium methylate in methyl alchol at 40–120° C. for 2–20 hours, 5-chloro-3-methoxy-2-sulfapyrazine (IV) is obtained.

In the other synthesis, 2,3,5-trichloro-pyrazine (II) is first transformed into 2-amino-3,5-dichloro-pyrazine (VI) by reaction with aqueous ammonia, preferably at 69–140° C. under pressure for 6–30 hours. Upon treatment of (VI) with an alkaline salt of methyl alcohol in alcoholic solution, such as the sodium or the potassium methylate in methyl alcohol, at 40–120° C. for 2–20 hours, 2-amino-5-chloro-3-methoxy-pyrazine (VII) is obtained. Upon condensation of (VII) with a para-acylaminobenzene-sulfohalide, such as the para-acetylaminobenzene-sulfochloride, in the presence of a tertiary amine, such as pyridine, mixed or not with acetone, and thereafter saponifying, with alkali, the acetyl linkage in the $N_4$ position of the sulfonilamidic group, (VII) is transformed into the 5-chloro-3-methoxy-2-sulfapyrazine (IV).

Finally the product (IV), by hydrogenation, preferably at room temperature and atmospheric pressure, in the presence of a catalyst such as 5–10% palladium over charcoal, and of an acid acceptor, such as the sodium hydroxide or the potassium hydroxide, or triethylamine, or other tertiary amine, is transformed into the 3-methoxy-2-sulfapyrazine (V).

The success of the processes of the present invention, for preparing the 3-methoxy-2-sulfapyrazine, is based upon the discovery that 2,3,5-trichloro-pyrazine (II) reacts selectively in the 2-position, in the conversion with ammonia to compound (VI), as well as in the alternative conversion with sulfanilamide to compound (III). It was quite unexpected that the treatment of the 2,3,5-trichloro-pyrazine with sulfanilamide or ammonia should only, or prevalently, cause the substitution of the chloro atom in the 2-position of the pyrazine ring by a sulfanilyl or amino radical respectively. Also, the selective methoxylations in the 3-position of 2-sulfanilamido-3,5-dichloropyrazine, and of 2-amino-3,5-dichloropyrazine, are unexpected reactions. These reactions, and the subsequent substitution of the chloro atom with hydrogen (the IV→V reaction), could theoretically result in three end products, namely the isomers 3-methoxy-2-sulfapyrazine (V), 5-methoxy-2-sulfapyrazine, and 5-methoxy-3-sulfapyrazine (or 6-methoxy-2-sulfapyrazine). In contrast, we have found that only one of said isomers is obtained, and in a very good yield, namely 3-methoxy-2-sulfapyrazine (V).

Some of the novel products of the present invention, particularly the 3,5-dichloro-2-sulfapyrazine (III) and the 5-chloro-3-methoxy-2-sulfapyrazine (IV), have good bacteriostatic activity on infections caused by staphylococcus or streptococcus or pneumococcus or other microbial agents.

The following examples are meant to illustrate the invention without limiting it.

EXAMPLE 1

*2,3,5-Triketo-Piperazine (I)*

To a boiling mixture of 13 grams of aminoacetamide, 26 grams of ethyl oxalate and 250 cm.$^3$ of ethanol are added, over a period of 25 minutes, a solution of 4.6 grams of sodium dissolved in 200 cm.$^3$ of ethanol. The reaction mixture is kept at boiling temperature for a further 30 minutes, is then cooled and the sodium salt of the triketo-piperazine is filtered off, in quantitative yield. The free triketo-piperazine base is obtained by dissolving the sodium salt in 2 N HCl, or by suspending the salt in an inert solvent saturated with HCl. In the latter case, the separated triketo-piperazine contains NaCl as impurity but can be employed in the succeeding chlorination.

In the same manner, aminoacetamide hydrochloride is condensed with ethyl oxalate in methanol, in the presence of two moles of sodium methylate. The sodium salt of triketo-piperazine which separates contains NaCl as impurity but can be employed in the succeeding chlorination.

EXAMPLE 2

*2,3,5-Trichloro-Pyrazine (II) From I (Method With $POCl_3$ and $PCl_5$)*

Into a Carius tube are poured 1 gram of 2,3,5-triketo-piperazine (I), 3 cm.$^3$ of phosphorus oxychloride, and 6 grams of phosphorus pentachloride. The mixture is heated to 110° C. for 60 hours. Then it is cooled, poured into ice, extracted with dichloromethane, and the solvent then evaporated. 0.8 gram of 2,3,5-trichloro-pyrazine are obtained: It is a white product melting at about 32° C.

EXAMPLE 3

*2,3,5-Trichloro-Pyrazine (II) From I (Method With the $POCl_3$ Alone)*

Into a Carius tube are poured 1 gram of 2,3,5-triketo-piperazine (I), 8 cm.$^3$ of phosphorus oxychloride, and 1 gram of dimethylaniline. The mixture is heated to 150° C. for 4 hours, cooled, poured into ice, extracted with dichloromethane, and the solvent evaporated. 0.6 gram of 2,3,5-trichloro-pyrazine are obtained: It is a white product melting at about 32° C.

EXAMPLE 4

*3,5-Dichloro-2-Sulfapyrazine (III) From II*

27 grams of 2,3,5-trichloro-pyrazine (II) are added to 60 grams of sodium sulfanilamide in 60 grams of acetamide. The mixture is heated to 100° C. for 1 hour. The solution is filtered, acidified with acetic acid and the 3,5-dichloro-2-sulfapyrazine which separates is filtered. Yield: 95%; melting point=179–180° C.

Pure 3,5-dichloro-2-sulfapyrazine is crystallized from Cellosolve. Its melting point is 188–191° C.

EXAMPLE 5

*2-Amino-3,5-Dichloro-Pyrazine (VI) From II*

2,3,5-trichloro-pyrazine (II) is reacted with concentrated aqueous ammonia at 100° C. for 3 hours. The 2-amino-3,5-dichloro-pyrazine is then isolated. Yield: 80%; melting point=140–142° C.

EXAMPLE 6

*5-Chloro-3-Methoxy-2-Sulfapyrazine (IV) From III*

14 grams of crude 3,5-dichloro-2-sulfapyrazine (III) are added to a solution of 3 grams of sodium in 200 cm.$^3$ of methanol, and heated in an autoclave for 15 hours to 115° C. It is then cooled, the methanol evaporated, the mixture diluted with water, and acidified with acetic acid. Crude 5-chloro-3-methoxy-2-sulfapyrazine separates from the solution and is filtered off. Yield: 80%; melting point=176–179° C.

Pure 5-chloro-3-methoxy-2-sulfapyrazine melts at 180–182° C. (crystallized from Cellosolve).

EXAMPLE 7

*2-Amino-5-Chloro-3-Methoxy-Pyrazine (VII) From VI*

To a solution of 21 grams of sodium in 50 cm.$^3$ of methanol 11 grams of 2-amino-3,5-dichloro-pyrazine (VI) are added. The mixture is refluxed 4 hours; the methanol is eliminated, and the residue is pulped with water and the product filtered off. Yield of (VII): 90%; melting point=110–113° C.

A sample crystallized from benzene-petrol ether melts at 128–131° C.

EXAMPLE 8

*5-Chloro-3-Methoxy-2-Sulfapyrazine (IV) From VII*

The 2-amino-5-chloro-3-methoxy-pyrazine (VII) dissolved in pyridine is mixed with p-acetylamino-benzene-sulfochloride, at a cool temperature and under stirring. The reaction mixture is kept for 20 hours at room temperature, and is then heated to 50° C. for 4 hours. The solution is concentrated in vacuo to about one third of its volume, and is then poured into ice-water.

The product is filtered and washed with water. The 2 - (p - acetylamino-benzene-sulfonamido) - 5 - chloro - 3-methoxy-pyrazine thus obtained is de-acetylated by refluxing with 10% aqueous NaOH for 1 hour.

The solution is then cooled, and is slightly acidified (pH=6) with 2 N HCl. The 5-chloro-3-methoxy-2-sulfapyrazine is thus isolated. Yield: 80%; melting point= 180–182° C.

EXAMPLE 9

*3-Methoxy-2-Sulfapyrazine (V) From IV*

To 8 grams of 5-chloro-3-methoxy-2-sulfapyrazine (IV), dissolved in 100 cm.³ of water containing 3 grams of sodium hydroxide, are added 4 grams of 5% palladium over charcoal and hydrogenated under atmospheric pressure. When absorption of hydrogen is over, the catalyst is filtered off and the filtrate acidified with acetic acid. Crude 3-methoxy-2-sulfapyrazine separates. It melts at 164–166° C. (Yield: 85%).

Pure 3-methoxy-2-sulfapyrazine, crystallized from ethyl-Cellosolve-water, melts at 175° C.

The reaction sequence employed to make 2-amino-3-methoxy-5-chloro-pyrazine is based on the unexpected property of 2,3,5-trichloro-pyrazine of reacting selectively in the 2-position, in the conversion with aqueous ammonia to give 2-amino-3,5-dichloro-pyrazine (VI). It was unexpected that by reacting 2,3,5-trichloro-pyrazine with aqueous ammonia only the 2-chloro-atom is replaced by an amino-group, while the two chloro-atoms in the 3- and 5-position remain unaffected.

Also, the selective methoxylation in the 3-position of 2-amino-3,5-dichloro-pyrazine is an unexpected and surprising reaction. A chemist trained in heterocyclic field would have predicted the formation of several end products upon reaction of 2,3,5-trichloro-pyrazine with aqueous ammonia and subsequent reaction with sodium or potassium methylate. Among such conceivable end products are 2-methoxy-3-amino-5-chloro-pyrazine, 2 - amino-3-chloro-5-methoxy-pyrazine, and 2-amino-3-methoxy-5-chloro-pyrazine. The prospect, and even probability, of obtaining a mixture of isomeric end products would have discouraged chemists, and have caused them to direct their efforts to other routes for preparation of 3-methoxy-2-amino-pyrazine.

The preparation of 3-methoxy-2-amino-pyrazine from 2,3,5-trichloro-pyrazine constitutes a reduction to practice of a process which, in advance, on paper, had not the slightest probability of success.

We claim:

A process for preparing 2-amino-3-methoxy-5-chloro-pyrazine which comprises reacting 2,3,5-trichloro-pyrazine with aqueous ammonia, to make 2-amino-3,5-dichloro-pyrazine, and reacting said product with sodium methylate in methanol to make 2-amino-3-methoxy-5-chloro-pyrazine.

References Cited in the file of this patent

UNITED STATES PATENTS

| | | |
|---|---|---|
| 2,396,067 | Winnek et al. | Mar. 5, 1946 |
| 2,494,524 | Sprague | Jan. 10, 1950 |
| 3,098,069 | Camerino et al. | July 16, 1963 |

OTHER REFERENCES

Elderfield: vol. 6 (1937), pages 390–1.
Safir et al.: J. Org. Chem., vol. 18 (1953), pages 106–114.